(12) United States Patent
Mizukami et al.

(10) Patent No.: US 8,178,611 B2
(45) Date of Patent: May 15, 2012

(54) POLYMER COMPOSITION

(75) Inventors: Yoshikatsu Mizukami, Osaka (JP); Eiji Akiba, Osaka (JP)

(73) Assignees: Sanc Salaam Corporation, Osaka (JP); Kuraray Living Co., Ltd., Osaka (JP)

( * ) Notice: Subject to any disclaimer, the term of this patent is extended or adjusted under 35 U.S.C. 154(b) by 266 days.

(21) Appl. No.: 12/595,494

(22) PCT Filed: May 26, 2008

(86) PCT No.: PCT/JP2008/001310
§ 371 (c)(1),
(2), (4) Date: Oct. 9, 2009

(87) PCT Pub. No.: WO2008/149505
PCT Pub. Date: Dec. 11, 2008

(65) Prior Publication Data
US 2010/0210764 A1    Aug. 19, 2010

(30) Foreign Application Priority Data

May 31, 2007   (JP) ................................ 2007-144448
Jan. 15, 2008  (JP) ................................ 2008-005127

(51) Int. Cl.
*C08L 53/02* (2006.01)

(52) U.S. Cl. .......... 524/505; 524/81; 524/115; 524/147; 524/388; 524/377

(58) Field of Classification Search ............. 524/81, 524/115, 147, 388, 354, 356, 377, 505
See application file for complete search history.

(56) References Cited

U.S. PATENT DOCUMENTS

| | | | |
|---|---|---|---|
| 6,472,456 B1 | 10/2002 | Horsey et al. | |
| 2002/0015847 A1 | 2/2002 | Shimizu et al. | |
| 2004/0162393 A1 | 8/2004 | Matsuda et al. | |
| 2005/0285086 A1 | 12/2005 | Kosaka et al. | |
| 2009/0258973 A1* | 10/2009 | Mizukami et al. ............. | 524/81 |

FOREIGN PATENT DOCUMENTS

| | | | |
|---|---|---|---|
| EP | 0 719 833 A2 | | 7/1996 |
| JP | 05-070679 | * | 3/1993 |
| JP | 5-70679 A | | 3/1993 |
| JP | 7-331085 A | | 12/1995 |
| JP | 8-41363 A | | 2/1996 |
| JP | 10-87920 A | | 4/1998 |
| JP | 10-168235 A | | 6/1998 |
| JP | 11-189686 A | | 7/1999 |
| JP | 2000-103934 A | | 4/2000 |
| JP | 2001-106844 A | | 4/2001 |
| JP | 2003-27330 A | | 1/2003 |
| JP | 2003-105212 A | | 4/2003 |
| JP | 3540759 B2 | | 4/2004 |
| JP | 3679738 B2 | | 5/2005 |
| WO | 2007/010787 A1 | | 1/2007 |
| WO | WO 2007/010787 A1 | * | 1/2007 |
| WO | 2008/044630 A1 | | 4/2008 |

OTHER PUBLICATIONS

European Search Report dated Aug. 3, 2010 from corresponding European Patent Application No. EP 08 76 3910.
International Search Report for PCT/JP2008/001310 mailed Sep. 2, 2008.

\* cited by examiner

*Primary Examiner* — Ling Choi
(74) *Attorney, Agent, or Firm* — Roberts Mlotkowski Safran & Cole, P.C.

(57) ABSTRACT

[Object] To provide a polymer composition composed of a functional liquid compound and a polymer, in which the functional liquid compound is phase-separated from but dispersed in the polymer, and a molded product of the polymer composition at lower prices.

[Solution] A polymer composition of the present invention includes: a thermoplastic matrix polymer X; a block copolymer Y dispersed in the matrix polymer X; and an additive Z containing an organic compound which is liquid at a melting point of the matrix polymer X or a solution of the organic compound, wherein any two of the matrix polymer X, the block copolymer Y and the organic compound are phase-separated, the block copolymer Y includes a block Y1 which is composed of polymerized monomers having a ring structure and a block Y2 which is composed of monomers different from the monomers of the block Y1, and the organic compound has an intramolecular ring structure or a ring structure formed in a molecule or between molecules due to intermolecular interaction, the organic compound being bleeding-out in the block copolymer Y dispersed in the matrix polymer X.
Selected Figure]None

12 Claims, 2 Drawing Sheets

POLYMER COMPOSITION

TECHNICAL FIELD

The present invention is directed to a functional polymer composition and products formed of the composition used as a raw material, such as fibers, films, and injection-molded products.

BACKGROUND ART

Adding an additive to a polymer used as a raw material in an extrusion molding, blow molding, rotational molding, or injection molding process to give various functions to molded products has been conventionally considered.

Patent Document 1 proposes a composition which constitutes a liquid-in-solid polymer emulsion at room temperature, the composition including: a thermoplastic polymer (A); 0.1 to 50 parts by weight of a block copolymer (B) mixed with 100 parts by weight of the theinioplastic polymer (A), the block copolymer (B) being phase-separated from the thermoplastic polymer (A); and 0.1 to 20 parts by weight of a liquid compound (C) dispersed in 100 parts by weight of the mixture of the thermoplastic polymer (A) and the block copolymer (B), wherein the block copolymer (B) contains a block (b1) having high compatibility with the thermoplastic polymer (A) but low compatibility with the liquid compound (C) and a block (b2) having high compatibility with the liquid compound (C) but low compatibility with the thermoplastic polymer (A), the liquid compound (C) has low compatibility with the block (b1) and the thermoplastic polymer (A) but high compatibility with the block (b2), the liquid compound (C) being phase-separated from the thermoplastic polymer (A) and being liquid at 100° C. or lower, the liquid compound (C) is enclosed by the block copolymer (B) by a surfactant-like function of the block copolymer (B), the thermoplastic polymer (A) is a polyolefin polymer, the block (b1) is a polyolefin block and the block (b2) is a polystyrene block, and the block copolymer (B) is at least one selected from the group consisting of a polystyrene-poly(ethylene/propylene) block copolymer, a polystyrene-poly(ethylene/butylene) block copolymer, a polystyrene-poly(ethylene/propylene)-polystyrene block copolymer, a polystyrene-poly(ethylene/butylene)-polystyrene block copolymer, and a polystyrene-poly(ethylene-ethylene/propylene)-polystyrene block copolymer. However, Patent Document 1 fails to describe a liquid compound (C) which has low compatibility with the block (B2).

Adding a halogen compound or phosphor compound is known as a method for giving flame retardancy to polyolefin. Patent Document 2 discloses the following examples of the halogen compound: polybrominated diphenyl oxide (DE60F), decabromodiphenyl oxide (DBDOP), bis(2,3-dibromopropyl ether) of bisphenol A (PE68), brominated epoxy resin, ethylene-bis(tetrabromophthalimide) (BT93), 1,2-bis(tribromophenoxy)ethane (FF680), and tetrabromobisphenol A (SAYTEX® RB100). Among the polybrominated diphenyl oxides, compounds having 5 and 8 bromine atoms are accumulative and therefore do not comply with the RoHS Directive. Decabromodiphenyl oxide (DBDOP) was withdrawn from the RoHS Directive materials but has a melting point of 300° C. or higher and a large grain size of 4 μm and is therefore not suitable for uses as thin films or fine fibers.

Patent Document 2 discloses the following examples of the phosphor compound: tris(2,4-di-tert-butylphenyl)phosphite, bis(2,4di-tert-butyl-6-methylphenyl)ethyl phosphite, 2,2',2"-nitrilo[triethyl-tris-(3,3',5,5'-tetra-tert-butyl-1,1'-biphenyl-2,2'-diyl)phosphite], tetrakis(2,4di-butylphenyl) 4,4'-biphenylene-diphosphonite, tris(nonylphenyl)phosphite, bis(2,4di-tert-butylphenyl)pentaerythrityl diphosphite, 2,2'-ethylidenebis(2,4di-tert-butylphenyl)fluorophosphite, 2-butyl-2-ethyl-propan-1,3-diyl 2,4,6-tri-tert-butylphenyl phosphite, ammonium polyphosphate (APP) or (HOSTAFLAM® AP750), resorcinol diphosphate oligomer (RDP).

Patent Documents 3 and 4 disclose polypropylene fibers containing 0.5 w % or more of a phosphoric ester flame retardant and 0.5 w % or more of a NOR-type HALS. These patent documents were filed after the disclosure of Patent Document 2. Also, the disclosures of Patent Documents 3 and 4 are cumulative to the disclosures of Patent Document 2. Patent Document 2 also fails to define the content of phosphor which is an effective constituent for flame retardancy but only defines the content of phosphoric ester as being 0.5 w %, which is a 1/10 of a common value in the art, without evidence, thus lacking authenticity.

Trimethyl phosphate and triethyl phosphate of high phosphor content, 17 w % or higher, are most preferable as a flame retardant because of their low molecular weights. However, they are liquid at room temperatures and have poor compatibility with polyolefin when they are liquid and are therefore separated from polyolefin. Thus, in general, none of trimethyl phosphate and triethyl phosphate can be used as a flame retardant for polyolefin. Tricresyl phosphate, trixylenyl phosphate, cresyl diphenyl phosphate, cresyl dixylenyl phosphate, which are flame retardants having slightly greater molecular weights and low phosphor contents, about 8 w %, are also liquid at room temperatures and therefore generally cannot be used as a flame retardant for polyolefin. Meanwhile, triphenyl phosphate is solid at room temperatures but has a melting point of 49° C. and therefore melts when mixed with polyolefin. Thus, triphenyl phosphate cannot be used as a flame retardant for polyolefin. Tris(chloropropyl)phosphate and tris(dichloropropyl)phosphate are liquid at room temperatures, and tris(tribromoneopentyl)phosphate is also liquid at polyolefin process temperatures. They cannot be used as a flame retardant for polyolefin in general.

Patent Document 1: Gazette of PCT/JP2006/313824
Patent Document 2: Gazette of U.S. Pat. No. 6,472,456
Patent Document 3: Gazette of Japanese Patent No. 3540759
Patent Document 4: Gazette of Japanese Patent No. 3679738

DISCLOSURE OF INVENTION

Object of the Invention

An object of the present invention is to supply a polymer composition including a functional liquid compound and a polymer, phase-separated from each other, wherein the functional liquid compound is dispersed in the polymer, and a molded product of the polymer composition, at lower prices.

Means for Solving the Problems

A polymer composition of the present invention includes: a thermoplastic matrix polymer X; a block copolymer Y dispersed in the matrix polymer X; and an additive Z containing an organic compound which is liquid at a melting point of the matrix polymer X or a solution of the organic compound, wherein any two of the matrix polymer X, the block copolymer Y and the organic compound are phase-separated, the block copolymer Y includes a block Y1 which is composed of polymerized monomers having a ring structure and a block Y2 which is composed of monomers different from the monomers of the block Y1, and the organic compound has an intramolecular ring structure or a ring structure formed in a molecule or between molecules due to intermolecular interaction, the organic compound being bleeding-out into the block copolymer Y dispersed in the matrix polymer X.

The term "bleed-out" used herein is defined as follows. When the matrix polymer X, the block copolymer Y, and the organic compound are kneaded in a kneader-extruder, for example, these three materials are phase-separated from one another, and the block copolymer Y forms clusters due to mechanical shearing so that the clusters of the block copolymer Y are dispersed in the matrix polymer X. The cluster of the block copolymer Y is an aggregate of molecules or a layered structure of molecular aggregates where a type of polymer blocks of the block copolymer Y constitute the outer part of the cluster while the other type of polymer blocks constitute the inner part. Meanwhile, the organic compound gathers outside the system of the matrix polymer X because the organic compound would be unstable if retained inside the system of the matrix polymer X. In this state, "outside the system of the matrix polymer X" refers to the interface between the matrix polymer X and the block copolymer Y, the interface between the matrix polymer X and the barrel, part of the block copolymer Y cluster in which the intermolecular density is lower, i.e., a space enclosed by the inner ends of the polymer blocks that constitute the inner part of the cluster (inner part of the block copolymer Y), and the interface of the layered structure. The organic compound, phase-separated from the matrix polymer X and the block copolymer Y, aggregates in these three regions referred to as "outside the system of the matrix polymer X". However, the amount of the organic compound retained at the interface between the matrix polymer X and the block copolymer Y and at the interface between the matrix polymer X and the barrel is very small because the three components are phase-separated from one another. The inner part of the block copolymer Y can expand till the molecules of the block copolymer Y are aligned to have one layer thickness, and the expansion of the inner part of the block copolymer Y enables the volume of the inside space of the block copolymer Y cluster to increase. Thus, the organic compound passes through the interface between the matrix polymer X and the block copolymer Y and through the molecule layers of the block copolymer Y and gathers outside the system formed by the matrix polymer X and the block copolymer Y, i.e., in the inner space of the block copolymer Y. This phenomenon is referred to as "bleed-out" in the present specification. This phenomenon is equivalent to a phenomenon commonly called "bleed-out", i.e., such a phenomenon that, when the matrix polymer X and an organic compound of low hydrophilicity with the matrix polymer X are mixed, the organic compound is phase-separated from the matrix polymer X and transfers to the surface of the matrix polymer X (the interface between the matrix polymer X and air) that is outside the system of the matrix polymer.

Examples of the intermolecular interaction include hydrogen bond, van der Waals force, and ionic bond force. The ring structure formed in a molecule or between molecules due to intermolecular interaction refers to an annular molecule structure in a single molecule, or an annular structure formed by association of molecules, in which intermolecular interaction is considered as a type of bond.

Effects of the Invention

A polymer composition molded product of the present invention contains a functional liquid compound and enables supply of inexpensive functional products that provide hydrophilicity, antistaticity, hydrophobicity, anti-smear property, anticorrosive property, antibacterial property, antifungal property, antiviral property, antisepticity, repellency, insecticidal property, antisepticity, aromaticity, antifouling property, dyeability, peelability, cohesivity, adhesivity, etc.

BEST MODE FOR CARRYING OUT THE INVENTION

Figure 1:
FIG. 1 is an SEM image of the polymer composition of Example 5.

In Patent Document 1, the liquid compound is an organic compound or organic compound solution which has higher compatibility with polystyrene than with polyolefin and which contains an aromatic ring, alicyclic skeleton or polar group. The examples of the liquid compound include: a natural essential oil, such as terpenes, and the like; a conifer essential oil, such as cedarwood oil containing a large quantity of thuyopsene with excellent insect repellency and tick repellency; a peppermint oil containing a large quantity of menthol with excellent rodent repellency; an eucalyptus oil with excellent antibacterial and antiviral properties and bronchodilatation effect; a lemongrass oil with excellent antifungal property; and a lavender oil with excellent aromatic property. Patent Document 1 also discloses the following examples. The organic compound with agricultural chemical effects may be a pyrethroid compound insecticide or herbicide, such as permethrin, or the like. The organic compound with fertilization effects may be a low-molecular organic material containing amino acids. The organic compound with attraction effects may be an animal-attracting hormone derived from animals or plants. The organic compound with repellency may be capsaicin, limonene, or the like, which is repellent to animals. The organic compound with bactericidal effects may be triclosan. The organic compound with antifungal effects may be an isothiazoline compound. The organic compound with antibacterial effects may be zinc pyrithione. The preservative may be paraben, EDTA, or the like. The antistatic agent may be stearyl polyether monoglyceride, stearyl polyether diglyceride, stearyl aminopolyether, or the like. The examples of the liquid compound disclosed in this document are limited to only ones that have values of the solubility parameters similar to those of the block copolymer (B2). They are only examples that the liquid compound and the block copolymer (B2) have greatly different values of the solubility parameters, i.e., consisting of three constituents, a thermoplastic matrix polymer, a block copolymer dispersed in the matrix polymer, and an organic compound or organic compound solution which is liquid at melt-processing temperatures. Patent Document 1 fails to disclose a composition wherein any two of these constituents are phase-separated from each other.

Among the examples of the phosphor compound for use as a flame retardant disclosed in Patent Document 2, tris(2,4-di-tert-butylphenyl)phosphite has the smallest molecular weight of 647 and the lowest melting point of 187° C. When a mixture of such a phosphor compound and polyolefin is molten, the phosphor compound and polyolefin separate from each other because they do not have compatibility. Therefore, mixing a large amount of flame retardant into polyolefin is commonly achieved by mixing a phosphor compound at a temperature lower than its melting point, e.g., in the form of powder, into molten polyolefin. In this case, impalpable powder of the phosphor compound is mixed into polyolefin so as to be dispersed therein. However, dispersion of the impalpable phosphor compound powder is very difficult to achieve because secondary aggregation occurs. This patent document describes, in the twelfth example, using 1 w % of NOR-type HALS and 5 w % of ammonium polyphosphate (AP752) together to achieve the demanded retardancy.

The present inventors conducted various studies in view of the above circumstances and reached the inventions of the present applications. Hereinafter, embodiments of the present invention are described.

A polymer composition, which is an embodiment of the present invention, may include: a thermoplastic matrix polymer X; a block copolymer Y dispersed in the matrix polymer X; and an additive Z containing an organic compound which is liquid at a melting point of the matrix polymer X or a solution of the organic compound, wherein any two of the matrix polymer X, the block copolymer Y and the organic compound are phase-separated, the block copolymer Y includes a block Y1 which is composed of polymerized monomers having a ring structure and a block Y2 which is composed of monomers different from the monomers of the block Y1, and the organic compound has an intramolecular ring structure or a ring structure formed in a molecule or between molecules due to intermolecular interaction, the organic compound being bleeding-out in the block copolymer Y dispersed in the matrix polymer X.

The intramolecular ring structure or the ring structure follned in a molecule or between molecules due to intermolecular interaction may preferably be a ring of five to twelve members.

The block copolymer Y may preferably be of A-B type or B-A-B type.

The block Y2 of the block copolymer Y may preferably be any one of an ethylene-propylene copolymer, an ethylene-butylene copolymer, and an ethylene-propylene-ethylene copolymer.

The block copolymer Y may preferably include 10 w % or more of styrene as the monomers.

The block Y1 of the block copolymer Y may preferably be polystyrene and the block Y2 of the block copolymer Y is polyolefin. The content of the block copolymer Y in the polymer composition may preferably be from 0.5 w % to 20 w %.

The organic compound may preferably be an alkyl phosphate compound or halogenated alkyl phosphate compound for use as a flame retardant which has a melting point lower than 185° C. The block copolymer Y dispersed in the matrix polymer X may preferably have an average diameter of 2 µm or less.

The flame retardant may preferably be at least one of trimethyl phosphate, triethyl phosphate, triphenyl phosphate, tricresyl phosphate, trixylenyl phosphate, cresyl diphenyl phosphate, cresyl dixylenyl phosphate, tris(chloropropyl) phosphate, tris(dichloropropyl)phosphate, and tris(tribromoneopentyl)phosphate.

In one embodiment of the present invention, the polymer composition may be in the form of fiber.

The organic compound may preferably be at least one of glycerin, polyalkylene oxide, polysiloxane, imidazole, and denatured compounds thereof, an alcohol compound, an aldehyde compound, a ketone compound, and denatured compounds thereof, and two-molecule clusters thereof.

A polymer molded product in one embodiment of the present invention may be formed of the aforementioned polymer composition by extrusion molding, blow molding, rotational molding, or injection molding.

An embodiment of the present invention may be paint or ink containing the aforementioned polymer composition.

Examples of the organic compound include two or more contiguous ethylene oxide units, two or more contiguous ethylene glycol units, a 1,3-dipropanol unit, a vinyl acetyl ester unit, an associated ethanol unit, or a siloxane unit. These units and hydrogen atoms form a five- to twelve-membered ring, which is a ring structure formed in a molecule or between molecules due to intermolecular interaction. The intermolecular interaction includes non-covalent hydrogen bond.

An example of the 1,3-dipropanol unit (—CHOHCH2CHOH—) is glycerin (CH2OHCHOHCH2OH). In terms of stereochemistry, glycerin forms a 6-membered ring of 6 atoms in total including #1-carbon and a hydroxyl bonded thereto (3 atoms), #2-carbon, and #3-carbon and oxygen of a hydroxyl bonded thereto (2 atoms). The bond between the hydrogen of the hydroxyl bonded to #1-carbon and the oxygen of the hydroxyl bonded to #3-carbon is hydrogen bond. The 6-membered ring has a ring structure formed in a molecule due to intermolecular interaction. Glycerin is a polar compound, while styrene of the block copolymer Y which is an example used in this embodiment is a nonpolar compound. This embodiment uses a commonly-accepted solubility parameter, SP value, which is defined in PoLyInfo [Japanese language webpage] as "a value indicative of the magnitude of polarity per unit volume, which is specifically the cohesive energy density (CED) raised to the power of ½, i.e., the evaporation energy of one molecule per unit volume raised to the power of ½". The SP value of polystyrene calculated based on this definition is 7.6 $(J/cm^3)^{1/2}$ (K Ismet etc.; JPE, 19, 3, 197-208, 1999; hereinafter, the unit of the SP value is omitted), which is greatly different from the SP value of glycerin, 16.5. This means that polystyrene and glycerin are not compatible with each other and are hence phase-separated from each other.

Likewise, diethylene glycol (—OCH2CH2OCH2CH2-) includes the first unit formed by ether-bonded oxygen, #1-carbon, and #2-carbon, which is the primary repeating unit. The atoms of the first unit and ether-bonded oxygen, #1-carbon, and hydrogen bonded thereto of the subsequent repeating unit, i.e., 6 atoms in total, form a 6-membered ring. In this case, the bond between the hydrogen bonded to #1-carbon of the subsequent repeating unit and the ether-bonded oxygen of the first unit is hydrogen bond. Thus, the 6-membered ring, including a hydrogen atom, has a ring structure formed in a molecule due to intermolecular interaction. An example of the two or more contiguous ethylene oxide units (—CH2CH2O—) is an addition compound formed by 2 or more moles of ethylene oxide. The SP value of polyethylene glycol is 17.7 $(J/cm^3)^{1/2}$ (M Ryszard; EPG, 27, 4/5, 377-399, 1991), which is greatly different from that of polystyrene. The same basically applies to a case where ethylene glycol is replaced by polyisopropylene glycol. Alternatively, ethylene glycol may be replaced by an ethylene oxide-isopropylene oxide (—CH2CH2-CH2CH2CH2O—) adduct or an isopropylene oxide adduct.

Likewise, vinyl acetate unit (—CH2CHOCOCH3-) forms a 6-membered ring of hydrogen bonded to #1-carbon, #1-carbon, #2-carbon, oxygen of hydroxyl bonded to #2-carbon, carbon of an acetate carboxyl group, and oxygen double-bonded to the carbon of the acetate carboxyl group, i.e., 6 atoms in total. The bond between the hydrogen bonded to #1-carbon and the double-bonded oxygen is hydrogen bond. Thus, the 6-membered ring, including a hydrogen atom, has a ring structure formed in a molecule due to intermolecular interaction. An example of the vinyl acetate unit (—CH2CHOCOCH3-) is ethyl acetate, whose SP value is 9.1. The SP value difference between ethyl acetate and polystyrene is 2.6, which is about 3 times a commonly-accepted difference for solubility with polystyrene, 0.5., and hence, vinyl acetate and polystyrene are phase-separated from each other.

The same applies to carboxylic acids. For example, the SP value of oleic acid is 9.0. The SP value difference between oleic acid and polystyrene is 2.5, which is about 3 times a commonly-accepted difference for solubility with polystyrene, 0.5., and hence, oleic acid and polystyrene are phase-separated from each other.

The associated ethanol units (—CH2CHOH—) form a 7-membered ring of #2-carbon and hydrogen bonded thereto, #1-carbon and oxygen bonded thereto, #1-carbon of another molecule and oxygen and hydrogen bonded thereto, i.e., 7 atoms in total, in the form of two associated molecules (two-molecule cluster). In this case, the bond between the hydrogen bonded to #2-carbon and the oxygen bonded to #1-carbon of the another molecule and the bond between the hydrogen bonded to #2-carbon and the oxygen bonded to #1-carbon of the another molecule are hydrogen bond. Thus, the 7-membered ring, including hydrogen atoms, has a ring structure formed between molecules due to intermolecular interaction. An example of the associated ethanol units is an alcohol association of ethanol, isopropanol, or n-isopropanol. The SP value of ethanol is, for example, 12.7, which is greatly different from the SP value of polystyrene. Allyl isothiocyanate, which is known as the hotness ingredient of Wasabi and also known as an antifungal agent, an antiviral agent, and a repellent, forms a 12-membered ring in the form of two associated molecules (two-molecule cluster).

A siloxane unit (for example, —SiCH3-O—SiCH3-O—) forms a 6-membered ring of #1-silicon, #2-carbon and hydrogen and oxygen bonded thereto, and silicon and oxygen of a subsequent molecule, i.e., 6 atoms in total. The bond between the hydrogen bonded to #2-carbon and the oxygen of the subsequent unit is hydrogen bond. Thus, the 6-membered ring corresponds to a 6-membered ring including hydrogen atoms, which is a ring structure formed in a molecule due to intermolecular interaction. An example of the siloxane unit is polydimethylsiloxane. The SP value of polydimethylsiloxane is 14.9, which is greatly different from the SP value of polystyrene.

Patent Document 1 discloses mixing an organic compound which has no compatibility with polyolefin and a block copolymer containing polyolefin blocks (compatible with matrix polymer) and polystyrene blocks (compatible with liquid compound) into polyolefin as the matrix polymer such that the organic compound is retained in a micelle-like aggregate of the block copolymer, and the aggregate is stably dispersed in polyolefin, just like emulsion of water and oil by the effect of soap. The micelle-like aggregate of the block copolymer refers to a cluster of blocks associated such that polyolefin blocks constitute the outer part and polystyrene blocks constitute the inner part. This is an aggregate which has a similar structure to a micelle in water-oil emulsion. This technique utilizes the behavior of the block copolymer like an amphiphile due to an advantageous combination of the affinities of the respective blocks of the block copolymer with the polyolefin and the organic compound.

In this embodiment, however, one of the blocks of the block copolymer, block Y2, has affinity with the matrix polymer while the other block, block Y1, does not have affinity with the organic compound, and therefore, it is nonsensical within the common knowledge that the mixture turns into emulsion. In this case, it is generally understood in light of the knowledge of Patent Document 1 that mixing these three components results in complete separation of the matrix polymer and the organic compound into two layers, so that the block copolymer is in the form of an aggregate composed of the polyolefin blocks which constitute the outer part and the polystyrene blocks which constitute the inner part, and particles of such block copolymer are dispersed in the matrix polymer. As such, the organic compound is not retained inside the matrix polymer.

The applicants of the present application, however, conducted various researches and found that if, among the three components, the block Y1 and the organic compound have a certain relationship, the organic compound is enclosed by the cluster of the block copolymer so that a stable state of pseudo-emulsion which is similar in appearance to the emulsion of Patent Document 1 (droplet-dispersed state) arises. The certain relationship is similarity in shape of molecular stereostructure. It was found that a stable droplet-dispersed state arises when both the block Y1 and the organic compound have ring structures. The "ring structure" herein includes a ring structure formed in a molecule or between molecules due to hydrogen bond.

The aforementioned stable droplet-dispersed state is what Applicants found for the first time. The block Y1 of the block copolymer and the organic compound have a certain molecular structure similarity due to the similarity in molecular shape (both having ring structures), which is a different factor from the solubility represented by similarity in the SP value. The organic compound passes through the cluster where the block Y1 constitutes the inner part and stably settles in the inner space of the block Y1 or under the lower surface of the block Y1. This phenomenon may be considered as "bleeding-out" of the organic compound into the cluster.

In an embodiment of the present invention, the size (diameter) of the cluster of the block copolymer is preferably 10 μm or less, with which the droplet-dispersed state can be stably maintained for a long period of time. The upper limit of the size of stable clusters varies depending on the combination of the types of materials for the matrix polymer, the block copolymer and the organic compound, the production temperature, the kneading method, the kneading conditions, etc. The diameter of the cluster is preferably 10 μm or less, more preferably 1 μm or less, with which the droplet-dispersed state can be stably maintained for a long period of time.

In an embodiment of the present invention, a flame-retardant polymer composition contains as the organic compound a flame-retardant alkyl phosphate compound whose melting point is lower than 185° C. The flame retardant is in the form of droplets with the average diameter of 2 μm or less, dispersed in the matrix polymer X. The flame retardant is preferably at least one of alkyl phosphate compounds, such as trimethyl phosphate, triethyl phosphate, triphenyl phosphate, tricresyl phosphate, trixylenyl phosphate, cresyl diphenyl phosphate, and cresyl dixylenyl phosphate, and halogenated alkyl phosphate compounds, such as tris(chloropropyl)phosphate, tris(dichloropropyl)phosphate, and tris(tribromoneopentyl)phosphate. Also, the polymer composition preferably contains 0.5 to 20.0 w % of the block copolymer Y, which is composed of the polyolefin block Y2 and the polystyrene block Y1. The block copolymer Y is of A-B type or B-A-B type. The polyolefin block Y2 is any one of an ethylene-propylene copolymer, an ethylene-butylene copolymer, and an ethylene-propylene-ethylene copolymer. The block copolymer Y preferably contains 10 w % or more of styrene. A preferable form of the polymer composition of the present embodiment is fiber.

A polyolefin used for the matrix polymer X of the flame-retardant polymer composition of the present embodiment, for example, polypropylene, can be selected from commonly-employed grades represented by MFR. The desirable grade ranges from 20 to 60 MFR in fiber grade, from 1 to 10 MFR in film grade, and from 20 to 40 MFR in injection molding grade. In the case of meltblown fiber, the grades of about 200 to 2,000 MFR may be used. Adding 0.5 w % or more of thermal stabilizer, for example, hindered phenol or hindered amine, for capturing pyrolysis radicals of polyolefin will advantageously improve flame retardancy. Other additives may be added to polypropylene, for example, a commonly-employed UV-resistant agent, a flatting agent, such as titanium oxide, a pigment, a different type of flame retardant, an antibacterial agent, an antifungal agent, or an aromatic agent. Also, denatured propylene may be contained in an amount which does not significantly affect the physical properties of the composition.

Another example of polyolefin is polyethylene. Alternatively, it may be a partially-denatured TPO.

Examples of the block copolymer Y include A-B type polyethylene-propylene/polystyrene (SEP), B-A-B type polystyrene/polyethylene-propylene/polystyrene (SEPS), polystyrene/polyethylene-butylene/polystyrene (SEBS), and polystyrene/(polyethylene/polyethylene-propylene)/polystyrene (SEEPS). Specific examples are SEPTON™ products having different styrene contents and molecular weights commercially available from KURARAY CO., LTD.

The block copolymer Y preferably contains 10 w % or more of styrene because close molecular structure similarity is achieved between the block copolymer Y and the flame retardant. More preferably, the styrene content is 20 w % or more. The block copolymer preferably has a smaller molecular weight because a larger number of small clusters can be formed. The smaller ones of the clusters have diameters of submicron order. When the polymer composition is in the form of pellets, the clusters rarely scatter visible light and are slightly opaque.

The organic compound flame retardant used in the present embodiment may be a phosphorus compound, such as trimethyl phosphate, triethyl phosphate, triphenyl phosphate, tricresyl phosphate, trixylenyl phosphate, cresyl diphenyl phosphate, or cresyl dixylenyl phosphate, or a halogenated alkyl phosphate compound, such as tris(chloropropyl)phosphate, tris(dichloropropyl)phosphate, and tris(tribromoneopentyl)phosphate. Among these, a non-halogen flame retardant, for example, trimethyl phosphate with phosphor content of 21 w % or triethyl phosphate with phosphor content of 17 w %, is preferable because excellent flame retardancy is achieved even with a small content. In a situation where halogen may be used, a halogenated alkyl phosphate compound, for example, tris(chloropropyl)phosphate, tris(dichloropropyl)phosphate, or tris(tribromoneopentyl)phosphate, is preferable because halogen and phosphor synergically improves the flame retardancy. Among these, tris(tribromoneopentyl)phosphate is preferable because excellent flame retardancy is achieved even with a small content.

The content of the organic compound flame retardant is as indicated below when a phosphoric ester is solely used as the flame retardant, although the following values do not always adequate because the required flame retardancy varies depending on the applications. The phosphor content is 0.5 w % or more for injection-molded products (for example, adding 3 w % or more of triethyl phosphate achieves the phosphor content of 0.5 w % or more), preferably 0.7 w % or more (for example, 4.2 w % or more of triethyl phosphate), and more preferably 1.0 w % or more for fiber applications (for example, 6 w % or more of triethyl phosphate).

When halogenated phosphate ester is used, bromine is more suitable than chloride in some types of halogen because a smaller bromine content is required. For brominated phosphate ester, the bromine content is preferably 0.7 w % or more. In the case where the content of tris(tribromoneopentyl)phosphate is 1 w %, the bromine content is 0.7 w %, and the phosphor content is 0.03 w %. The tris(tribromoneopentyl)phosphate content is preferably 1.5 w %. In this case, the bromine content is 1.05 w %, and the phosphor content is 0.045 w %. More preferably, the tris(tribromoneopentyl)phosphate content is 2 w %. In this case, the bromine content is 1.4 w %, and the phosphor content is 0.06 w %. For chlorinated phosphate ester, the chloride content is preferably 1.0 w % or more. In the case where the tris(dichloropropyl)phosphate content is 2 w %, the chloride content is 1.0 w %, and the phosphor content is 0.07 w %. The tris(dichloropropyl)phosphate content is preferably 3 w %. In this case, the chloride content is 1.50 w %, and the phosphor content is 0.11 w %. More preferably, the tris(dichloropropyl)phosphate content is 4 w %. In this case, the chloride content is 2.0 w %, and the phosphor content is 0.14 w %.

The mixing extruder used for production of the polymer composition of the present embodiment is preferably a twin screw extruder, which provides a greater kneading efficiency. The twin screw extrudeer is preferably of a liquid-injectable, side-injection type which provides a sufficient space for the kneading section after liquid injection. Kneading after liquid injection is preferably performed with L/D 30 or more. To improve the kneading efficiency, increasing the screw rotation speed is preferable. The screw rotational speed is preferably 400 rpm or faster, more preferably 800 rpm or faster.

The extruder is preferably explosion proof when the organic compound used has a low flash point. However, in fabrication of a product of the present embodiment, such as an injection-molded product, fiber, nonwoven fabric, or film, the concentration of the organic compound does not rise to the explosion limit when a dilution of the organic compound is used. Therefore, the product of the present embodiment can be fabricated with generally-used facilities and fabrication methods of non explosion-proof, and thus, the polymer composition of the present embodiment is of great versatility.

When necessary, any additive may be contained in a composition of an embodiment of the present invention so long as it does not adversely affect the composition. Alternatively, a plurality of polymer composition embodiments may be appropriately mixed together such that their functions are effective in one composite. The organic compound may be mixed with a solvent to prepare a solution or may be mixed with another material to prepare an additive.

A method for producing a flame-retardant polypropylene fiber which is an embodiment of the present invention may be carried out with a common master batch or compound, such as filament, staple, spunbond fiber, or meltblown fiber. For spinning of filament, staple, and spunbond fiber, the die temperature is, for example, 230° C. to 250° C. For spinning of meltblown fiber, the die temperature is, for example, 280° C. to 300° C.

In the case of filament, POY is produced using a spin-draw machine and then subjected to a subsequent process, for example, false twisting, to produce a bulky yarn. Alternatively, BCF may be produced as a carpet yarn.

A method for producing a flame-retardant polypropylene film which is another embodiment of the present invention may be a production method carried out with a common master batch or compound, such as inflation method or T-die method. This film may be used as a coating material to form a laminate product. Alternatively, this film may be transformed into a tape yarn, which then may be woven into a hessian cloth that can be used for a wrapping bag, for example.

A flame-retardant composition which is an embodiment of the present invention may be extrusion-molded into a flame-retardant cable sheath for, for example, a power transmission cable. With this cable sheath, a polyolefin non-halogen flame-retardant cable can be produced using existing facilities.

Another polymer composition of this embodiment can be produced wherein the matrix polymer X is polysuccinate adipate of large polarity, the block copolymer Y is a polystyrene-polyethylene block copolymer (SEP2002), and the organic compound bleeding out of the matrix polymer is eucalyptus oil which contains 90 w % of 1,8-cineole having an epoxy group of large polarity, the polymer composition being a metastable system in which the components are phase-separated from one another. This fact proves that the similarity in polarity, which is conventionally taken as the measure of solubility, is inconsistent with the fabrication method of the composition of the present embodiment.

Polysuccinate adipate is a biodegradable polymer readily miscible with polylactide which is also known as a biodegradable polymer. Polysuccinate adipate is also known as a modifier for improving the ductility of polylactic acid that is of poor ductility. Polylactic acid can readily be decomposed by heat, while polysuccinate adipate can not readily be decomposed and therefore does not require thorough drying. Thus, polysuccinate adipate is preferable as a master batch base polymer which gives functionality to polylactic acid.

Further details will be described in the examples below.

Evaluation of flame retardancy on test cloth samples was carried out based on the vertical methane burner method. Cloth washed with water and dried to a predetermined humidity was brought into contact with a flame of 38 mm from a methane burner for 3 seconds. The length of carbonized part of the cloth was measured, and an evidence of inflammation on a gauze sheet laid under the cloth was checked. The test was conducted 5 times. A sample with the maximum carbonization length being less than 254 mm, the average carbonization length being less than 178 mm, and no inflammation evidence on the gauze was classified as an acceptable flame-retardant cloth.

EXAMPLES

Example 1

60 parts by weight of polypropylene (PP), Prime Polypro™ MFR45 manufactured by Prime Polymer Co., Ltd., as the matrix polymer X, and 20 parts by weight of SEPTON™ SEPS2104-type (styrene content=65 w %) manufactured by KURARAY CO., LTD., as the block copolymer Y, were supplied at constant supply rates from hoppers into a high-speed rotation twin screw kneader-extruder, to which 20 parts by weight of triethylene phosphate as the organic compound was side-injected. The kneader-extruder worked at the screw speed of 400 rpm, the maximum temperature of 200° C., and the die temperature of 190° C. to extrude the mixture in the form of a gut. The gut mixture was quenched and cut, whereby PP masterbatch pellets of Example 1 were produced.

The mixture of 40 parts by weight of the masterbatch pellets and 60 parts by weight of PP, Prime Polypro™ MFR45, was spun according to a spin-draw method at the spinning temperature of 240° C. and the spindle speed of 3,000 m/min to produce POY. The resultant POY was subjected to a false-twisting machine, such that PP multifilament of DTY 110 dTex/36 F of Example 1 was produced. A cross section of the multifilament was SEM-observed, and many micropores with the diameter of 1 μm or less were found. This fiber exhibited excellent mechanical properties: the tensile tenacity of 4.0 dN/dTex and the elongation of 48%. This fiber was knitted into a sample using a stocking machine, and the sample was subjected to the flame retardancy evaluation test. The results of the test were the maximum carbonization length of 58 mm, the average carbonization length of 38 mm, and no inflammation evidence on the gauze, which mean that the sample exhibited acceptable flame retardancy to non-halogen type flameproof apparel products. In this fiber, the content of triethylene phosphate was 8 w %, and the phosphor content was 1.3 w %. A cross section of this fiber was SEM-observed, and droplets of triethylene phosphate with the average size of 1 μm or less were found uniformly dispersed.

Comparative Example 1

As in Example 1, 92 parts by weight of PP, Prime Polypro™ MFR45, was supplied at a constant supply rate from a hopper into a high-speed rotation twin screwkneader-extruder, to which 8 parts by weight of triethylene phosphate was side-injected. The kneader-extruder worked at the screw speed of 400 rpm, the maximum temperature of 200° C., and the die temperature of 190° C., but triethylene phosphate phase-separated from PP was disgorged out of the die, so that formation of a gut of the mixture failed.

Example 2

As in Example 1, 60 parts by weight of PP, Prime Polypro™ MFR45 manufactured by Prime Polymer Co., Ltd., as the matrix polymer X, and 20 parts by weight of SEPTON™ SEPS2104-type (styrene content=65 w %) manufactured by KURARAY CO., LTD., as the block copolymer Y, were supplied at constant supply rates from hoppers into a high-speed rotation twin screw kneader-extruder, to which 20 parts by weight of tris(tribromoneopentyl) phosphate liquid with the melting point of 182° C. as the organic compound was side-injected. The kneader-extruder worked at the screw speed of 400 rpm, the maximum temperature of 200° C., and the die temperature of 190° C. to extrude the mixture in the form of a cord. The gut-like mixture was quenched and cut, whereby PP masterbatch pellets of Example 2 were produced.

The mixture of 10 parts by weight of the masterbatch pellets and 90 parts by weight of PP, Prime Polypro™ MFR45, was spun according to a spun-bonding method at the spinning temperature of 240° C. to produce nonwoven fabric of Example 2 with the weight of 30 g/m². The resultant nonwoven fabric was subjected to the flame retardancy evaluation test. The results of the test were the maximum carbonization length of 42 mm, the average carbonization length of 18 mm, and no inflammation evidence on the gauze, which mean that the nonwoven fabric exhibited acceptable flame retardancy to flameproof apparel products. In this fiber, the content of tris(tribromoneopentyl)phosphate was 2 w %, the phosphor content was 0.06 w %, and the bromine content was 1.4 w %. A cross section of this fiber was SEM-observed, and droplets of tris(tribromoneopentyl)phosphate with the average size of 1.7 μm or less were found uniformly dispersed.

Example 3

As in Example 1, 80 parts by weight of PP, Prime Polypro™ MFR30 manufactured by Prime Polymer Co., Ltd., as the matrix polymer X, and 10 parts by weight of SEPTON™ SEP2002-type (styrene content=30 w %) manufactured by KURARAY CO., LTD., as the block copolymer Y, were supplied at constant supply rates from hoppers into a high-speed rotation twin rotor kneader-extruder, to which 10 parts by weight of allyl thioisocyanate as the organic compound was side-injected. The kneader-extruder worked at the screw speed of 400 rpm, the maximum temperature of 200° C., and the die temperature of 190° C. to extrude the mixture in the form of a gut. The gut-like mixture was quenched and cut, whereby PP masterbatch pellets of Example 3 were produced.

Then, 10 parts by weight of the masterbatch pellets were diluted with 90 parts by weight of PP, Prime Polypro™ MFR45 manufactured by Prime Polymer Co., Ltd. The resultant dilution was used to produce a plate of Example 3 by an injection molding machine. A cross section of the plate was SEM-observed, and droplets of allyl thioisocyanate with the average size of 2 μm or less were found uniformly dispersed. The plate was subjected to an antifungal test in accordance with MS Z2911 with mixture of four types of fungi. The result of the test was such that growth of fungi was not detected over the plate, which means that the plate exhibited excellent antifungal property of '0' rank.

Example 4

As in Example 1, 80 parts by weight of polysuccinate adipate, Bionolle™ #3000 manufactured by SHOWA HIGH-POLYMER CO., LTD., as the matrix polymer X, and 10 parts by weight of SEPTON™ SEP2002-type (styrene content=30 w %) manufactured by KURARAY CO., LTD., as the block copolymer Y, were supplied at constant supply rates from hoppers into a high-speed rotation twin screw kneader-extruder, to which 10 parts by weight of allyl thioisocyanate as the organic compound was side-injected. The kneader-extruder worked at the screw speed of 400 rpm, the maximum temperature of 200° C., and the die temperature of 190° C. to extrude the mixture in the form of a gut. The gut-like mixture was quenched and cut, whereby masterbatch pellets of Example 4 were produced.

Then, 10 parts by weight of the masterbatch pellets were diluted with 90 parts by weight of PP, Prime Polypro™ MFR45 manufactured by Prime Polymer Co., Ltd. The resultant dilution was used to produce a plate of Example 4 by an injection molding machine. A cross section of the plate was SEM-observed, and droplets of allyl thioisocyanate with the average size of 2 μm or less were found uniformly dispersed. The plate was subjected to an antifungal test in accordance with JIS Z2911 with mixture of four types of fungi. The result of the test was such that growth of fungi was not detected over the plate, which means that the plate exhibited excellent antifungal property of '0' rank.

Example 5

85 kg of LDPE polymer (NOVATEC LL manufactured by Japan Polyethylene Corporation), as the matrix polymer X, and 5 kg of SEPTON™ (SEPS2002 manufactured by KURARAY CO., LTD.), as the block copolymer Y, were kneaded by a conventional biaxial extruder. While kneaded, the mixture was supplied with 25 kg of glycerin as the organic compound via a plunger pump according to a common procedure. The resultant mixture was extruded from the die head at 160° C. in the form of a gut. The gut-like mixture was quenched in water and cut with a cutter, whereby granular pellets of the composition of Example 5 were produced.

The GC measurement result of the pellets showed that the amount of residual glycerin was 22.8 w %, which was an excellent yield. A cross section of the pellets was SEM-observed, and sea-islands with the grain size of less than 0.1 μm as shown in FIG. 1 were found.

Then, the pellets were used to produce a molded plate of Example 5 by common injection molding. The contact angles of pure water and saline measured on the plate were 83 degrees and 86 degrees, respectively, which mean that the plate had an excellent hydrophilic surface. A cross section of the plate was SEM-observed, and sea-islands with the grain size of less than 1 μm were found.

Example 6

The composition of Example 6 is the same as Example 5 except that 20 w % of polyethylene oxide (L6 manufactured by MEISEI KAGAKU KOGYO Kabushiki Kaisha) was used in place of glycerin. The composition of Example 6 was used to produce granular pellets. A cross section of the pellets was SEM-observed, and sea-islands with the grain size of less than 1 μm were found.

Figure 2:
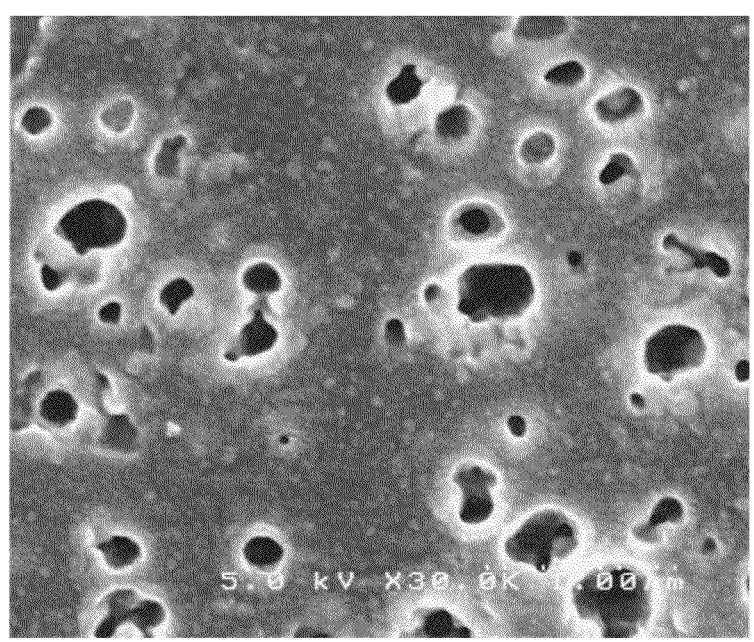
FIG. 2 is an SEM image of the polymer composition of Example 6.

Then, the pellets were used to produce a molded plate of Example 6 by common injection molding. The contact angles of pure water and saline measured on the plate were 84 degrees and 82 degrees, respectively, which mean that the plate had an excellent hydrophilic surface. A cross section of the plate was SEM-observed, and sea-islands with the grain size of less than 1 μm from which polyethylene oxide had fallen as shown in FIG. 2 were found.

Example 7

Figure 3:
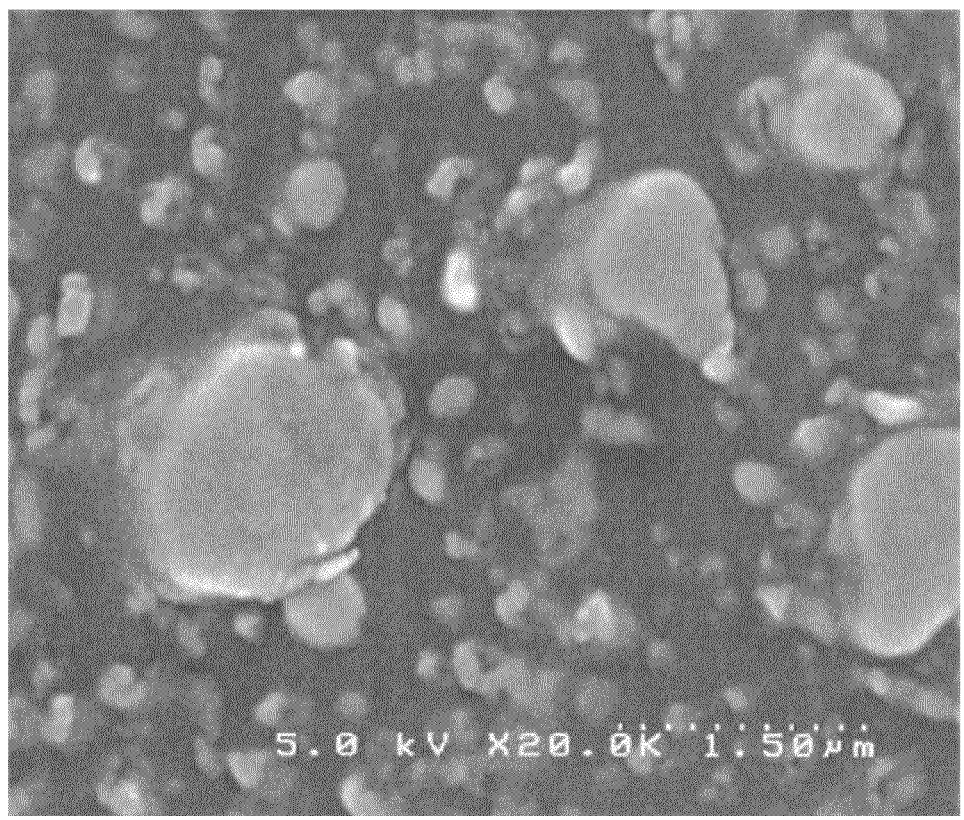
FIG. 3 is an SEM image of the polymer composition of Example 7.

Granular pellets of the composition of Example 7 were produced under the same conditions as those of Example 5 except that 15 w % of hydrophilic, end-modified polydimethylsiloxane was used in place of glycerin, and SEPTON™ used was SEPS2104. A cross section of the pellets was SEM-observed, and sea-islands with the grain size of less than 3 μm as shown in FIG. 3 were found.

Then, the pellets were used to produce a molded plate of Example 7 by common injection molding. The contact angles of pure water and saline measured on the plate were 87 degrees and 85 degrees, respectively, which mean that the plate had an excellent hydrophilic surface. A cross section of the plate was SEM-observed, and sea-islands with the grain size of less than 1 μm were found.

We produced another molded plate under the same conditions except that the organic compound used was water-repellent polydimethylsiloxane, KF54 manufactured by Shin-Etsu Chemical Co., Ltd., in place of hydrophilic, end-modified polydimethylsiloxane. The contact angles of pure water and saline measured on the plate were 127 degrees and 132 degrees, respectively, which mean that the plate had a super water-repellent surface.

Example 8

Granular pellets of the composition of Example 8 were produced under the same conditions as those of Example 5 except that 10 w % of isopropanol with the boiling point of 82° C. was used in place of glycerin, and the content of SEPTON™ was changed to 10 w %. The resultant pellets had a smooth lustrous surface. The smooth lustrous surface means evaporation did not occur during production even though the extrusion molding was performed at a temperature far higher than the boiling point of isopropanol. A cross section of the pellets was SEM-observed, and sea-islands with the grain size of less than 1 μm were found.

Also, we produced molded pellets of another composition of Example 8 under the same conditions except that an alcohol solution composed of the aforementioned isopropanol and 50 w % of ethylparaben dissolved therein was used in place of the isopropanol. The resultant pellets had a smooth lustrous surface. The smooth lustrous surface means evaporation did not occur during production even though the extrusion molding was performed at a temperature far higher than the boiling point of isopropanol. A cross section of the pellets was SEM-observed, and sea-islands with the grain size of less than 1 μm were found.

The pellets were diluted 50-fold with LDPE, and a molded plate was produced from the resultant dilution by common injection molding. The plate was subjected to an antifungal test in accordance with JIS Z 2911 2000 wet process with mixture of four types of fungi. The result of the test was such that growth of hypha was not detected in an area inoculated with the fungi even after two weeks.

Also, 10 parts by weight of the pellets of Example 8 and 90 parts by weight of polyethylene glycol are kneaded by a twin screw kneader-extruder, and double-capsule pellets were produced from the mixture. The double-capsule pellets were immersed in hot water at 80° C. such that polyethylene glycol was dissolved, and the pellet content in the cooled double-capsule pellets was 30 w %. The cooled double-capsule pellets were mixed in a commercially-available water base paint (general-purpose aqueous EG manufactured by Kansai Paint Co., Ltd.) by a mixer such that the content of the double-capsule pellets is 30 w % to produce a paint of Example 8. The paint was applied over a piece of wood to form a coating of 100 g/m² thick. The coated wood piece was dried and subjected to an antifungal test in accordance with JIS Z 2911 with mixture of five types of fungi. The result of the test was such that growth of hypha was not detected in an area inoculated with the fungi even after four weeks.

The paint of Example 8 may be used as ink.

Industrial Applicability

A polymer composition of the present invention can be used as a raw material for fibers, paints, etc.

The invention claimed is:

1. A polymer composition, comprising:
   a thermoplastic matrix polymer X;
   a block copolymer Y dispersed in the matrix polymer X; and
   an additive Z containing an organic compound which is liquid at a melting point of the matrix polymer X or a solution of the organic compound,
   wherein any two of the matrix polymer X, the block copolymer Y and the organic compound are phase-separated,
   the block copolymer Y includes a block Y1 which is composed of polymerized monomers having a ring structure, and a block Y2 which is composed of monomers different from the monomers of the block Y1, and
   the organic compound has an intramolecular ring structure or a ring structure formed in a molecule or between molecules due to intermolecular interaction, the organic compound being bleeding-out in the block copolymer Y dispersed in the matrix polymer X.

2. The polymer composition of claim 1, wherein the intramolecular ring structure or the ring structure formed in a molecule or between molecules due to intermolecular interaction is a ring of five to twelve members.

3. The polymer composition of claim 1, wherein the block copolymer Y is of A-B type or B-A-B type.

4. The polymer composition of claim 1, wherein the block Y2 of the block copolymer Y is any one of an ethylene-propylene copolymer, an ethylene-butylene copolymer, and an ethylene-propylene-ethylene copolymer.

5. The polymer composition of claim 1, wherein the block copolymer Y includes 10 w % or more of styrene as the monomers.

6. The polymer composition of claim 1, wherein
   the block Y1 of the block copolymer Y is polystyrene and the block Y2 of the block copolymer Y is polyolefin, and
   the content of the block copolymer Y in the polymer composition is from 0.5 w % to 20 w %.

7. The polymer composition of claim 1, wherein
   the organic compound is an alkyl phosphate compound or halogenated alkyl phosphate compound for use as a flame retardant which has a melting point lower than 185° C., and
   the block copolymer Y dispersed in the matrix polymer X has an average diameter of 2 μm or less.

8. The polymer composition of claim 7, wherein the flame retardant is at least one of trimethyl phosphate, triethyl phosphate, triphenyl phosphate, tricresyl phosphate, trixylenyl phosphate, cresyl diphenyl phosphate, cresyl dixylenyl phosphate, tris(chloropropyl)phosphate, tris(dichloropropyl) phosphate, and tris(tribromoneopentyl)phosphate.

9. The polymer composition of claim 7, wherein the polymer composition is in the form of fiber.

10. The polymer composition of claim 1, wherein the organic compound is at least one of glycerin, polyalkylene oxide, polysiloxane, imidazole, and denatured compounds thereof, an alcohol compound, an aldehyde compound, a ketone compound, and denatured compounds thereof, and two-molecule clusters thereof.

11. A polymer molded product formed of the polymer composition of claim 10 by extrusion molding, blow molding, rotational molding, or injection molding.

12. A paint or ink containing the polymer composition of claim 1.

* * * * *